United States Patent
Ito et al.

(10) Patent No.: US 10,384,658 B2
(45) Date of Patent: Aug. 20, 2019

(54) ESTIMATED TIME-TO-COLLISION (TTC) CALCULATION APPARATUS AND ESTIMATED TTC CALCULATION METHOD

(71) Applicants: DENSO CORPORATION, Kariya, Aichi-pref. (JP); TOYOTA JIDOSHA KABUSHIKI KAISHA, Toyota-shi, Aichi-ken (JP)

(72) Inventors: Yosuke Ito, Kariya (JP); Yukihiko Yamada, Kariya (JP); Akitoshi Minemura, Kariya (JP); Jun Tsuchida, Okazaki (JP); Masayuki Shimizu, Numazu (JP)

(73) Assignees: DENSO CORPORATION, Kariya, Aichi-pref. (JP); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 63 days.

(21) Appl. No.: 15/500,511

(22) PCT Filed: Aug. 3, 2015

(86) PCT No.: PCT/JP2015/071916
§ 371 (c)(1),
(2) Date: Jan. 30, 2017

(87) PCT Pub. No.: WO2016/017822
PCT Pub. Date: Feb. 4, 2016

(65) Prior Publication Data
US 2017/0210360 A1    Jul. 27, 2017

(30) Foreign Application Priority Data
Aug. 1, 2014 (JP) ................ 2014-157781

(51) Int. Cl.
  *B60T 7/22*  (2006.01)
  *G08G 1/16*  (2006.01)
  *B60R 21/0134*  (2006.01)

(52) U.S. Cl.
  CPC ............ *B60T 7/22* (2013.01); *B60R 21/0134* (2013.01); *G08G 1/16* (2013.01); *B60T 2201/02* (2013.01); *B60T 2201/022* (2013.01)

(58) Field of Classification Search
  None
  See application file for complete search history.

(56) References Cited

U.S. PATENT DOCUMENTS

| | | | |
|---|---|---|---|
| 2003/0176960 A1* | 9/2003 | Yamamura | B60K 31/0008 701/36 |
| 2006/0195231 A1* | 8/2006 | Diebold | B60R 21/013 701/1 |

(Continued)

FOREIGN PATENT DOCUMENTS

| | | |
|---|---|---|
| JP | 2003-267201 A | 9/2003 |
| JP | 2009-298171 | 12/2009 |

(Continued)

*Primary Examiner* — Rami Khatib
(74) *Attorney, Agent, or Firm* — Knobbe, Martne, Olson & Bear, LLP

(57) ABSTRACT

An estimated time-to-collision (TTC) calculation apparatus includes a distance acquisition unit, relative velocity acquisition unit, relative acceleration acquisition unit, and estimated TTC calculation unit. The distance acquisition unit acquires a distance X between the own vehicle and an object. The relative velocity acquisition unit acquires a relative velocity V of the object with respect to the own vehicle. The relative acceleration acquisition unit acquires a relative acceleration β of the object with respect to the own vehicle. The estimated TTC calculation unit calculates an estimated TTC t until the own vehicle collides with the object. In this apparatus and method, the estimated TTC (Continued)

calculation unit calculates t, based on the distance X and the relative velocity V, when the own vehicle is accelerating, and when the own vehicle is decelerating, calculates t based on the distance X, the relative velocity V, and the relative acceleration $\beta$.

10 Claims, 3 Drawing Sheets

(56) References Cited

U.S. PATENT DOCUMENTS

| | | | |
|---|---|---|---|
| 2007/0021876 A1* | 1/2007 | Isaji | B60K 28/066 701/1 |
| 2010/0023226 A1 | 1/2010 | Ito | |
| 2012/0116665 A1 | 5/2012 | Aoki et al. | |
| 2014/0156157 A1* | 6/2014 | Johnson | B60T 7/22 701/70 |

FOREIGN PATENT DOCUMENTS

| | | |
|---|---|---|
| JP | 2011-121491 A | 6/2011 |
| JP | 2013-152605 | 8/2013 |
| JP | 2016-034780 | 3/2016 |

\* cited by examiner

ESTIMATED TIME-TO-COLLISION (TTC) CALCULATION APPARATUS AND ESTIMATED TTC CALCULATION METHOD

CROSS-REFERENCE TO RELATED APPLICATION

This application is based on and claims the benefit of priority from earlier Japanese Patent Application No. 2014-157781 filed Aug. 1, 2014, the description of which is incorporated herein by reference.

BACKGROUND OF THE INVENTION

[Technical Field]

The present disclosure relates to techniques for predicting a collision between an own vehicle and an object. More particularly, the present disclosure relates to an estimated time-to-collision (TTC) calculation apparatus and an estimated TTC calculation method.

[Background]

Techniques have been developed for predicting a collision between an own vehicle and an object. JP-A-2010-030396 discloses a technique for calculating an estimated TTC, that is, an estimated period of time until the own vehicle collides with an object, based on, for example, a distance between the own vehicle and a preceding vehicle and a relative velocity between the own vehicle and the preceding vehicle. The estimated TTC can be used in a control operation for increasing the safety of the own vehicle. For example, when the estimated TTC is less than or equal to a predetermined value, an alert is outputted, or brakes are applied automatically.

CITATION LIST

Patent Literature

[Patent Literature 1] JP-A-2010-030396

The own vehicle and an object can be present in various situations. Depending on the situations, it is difficult to calculate an appropriate estimated TTC.

SUMMARY

The present disclosure considers such situations, and provides an apparatus for calculating an estimated TTC appropriate to a situation between the own vehicle and an object are present.

According to the present disclosure, a first estimated TTC calculation apparatus includes a distance acquisition unit, a relative velocity acquisition unit, a relative acceleration acquisition unit, and an estimated TTC calculation unit. The distance acquisition unit acquires a distance X between the own vehicle and an object. The relative velocity acquisition unit acquires a relative velocity V of the object with respect to the own vehicle. The relative acceleration acquisition unit acquires a relative acceleration $\beta$ of the object with respect to the own vehicle. The estimated TTC calculation unit calculates an estimated TTC t, that is, an estimated period of time until the own vehicle collides with the object. The estimated TTC calculation unit calculates the estimated TTC t, based on the distance X and the relative velocity V, when the own vehicle is accelerating, and when the own vehicle is decelerating, calculates the estimated TTC t, based on the distance X, the relative velocity V, and the relative acceleration $\beta$.

The first estimated TTC calculation apparatus of the present disclosure calculates an estimated TTC appropriate to a situation in which the own vehicle and the object are present.

A second estimated TTC calculation apparatus of the present disclosure includes a distance acquisition unit, a relative velocity acquisition unit, an own vehicle acceleration acquisition unit, a relative acceleration acquisition unit, and an estimated TTC calculation unit. The distance acquisition unit acquires a distance X between the own vehicle and an object. The relative velocity acquisition unit acquires a relative velocity V of the object with respect to the own vehicle. The own vehicle acceleration acquisition unit acquires an acceleration $\alpha$ of the own vehicle. The relative acceleration acquisition unit acquires a relative acceleration $\beta$ of the object with respect to the own vehicle. The estimated TTC calculation unit calculates an estimated TTC t, that is, an estimated period of time until the own vehicle collides with the object. The estimated TTC calculation unit calculates the estimated TTC t, based on the relative acceleration $\beta$, the distance X, and the relative velocity V, when a velocity Y of the own vehicle is greater than or equal to a predetermined value, and calculates the estimated TTC t, based on the acceleration $\alpha$, the distance X, and the relative velocity V, when the velocity Y of the own vehicle is less than the predetermined value.

The second estimated TTC calculation apparatus of the present disclosure calculates an estimated TTC appropriate to a situation in which the own vehicle and the object are present.

DETAILED DESCRIPTION OF THE PREFERRED EMBODIMENTS

Exemplary embodiments of the present disclosure will now be described with reference to the accompanying drawings.

<First Embodiment>

1. Configuration of Estimated TTC Calculation Apparatus 1

Figure 1:
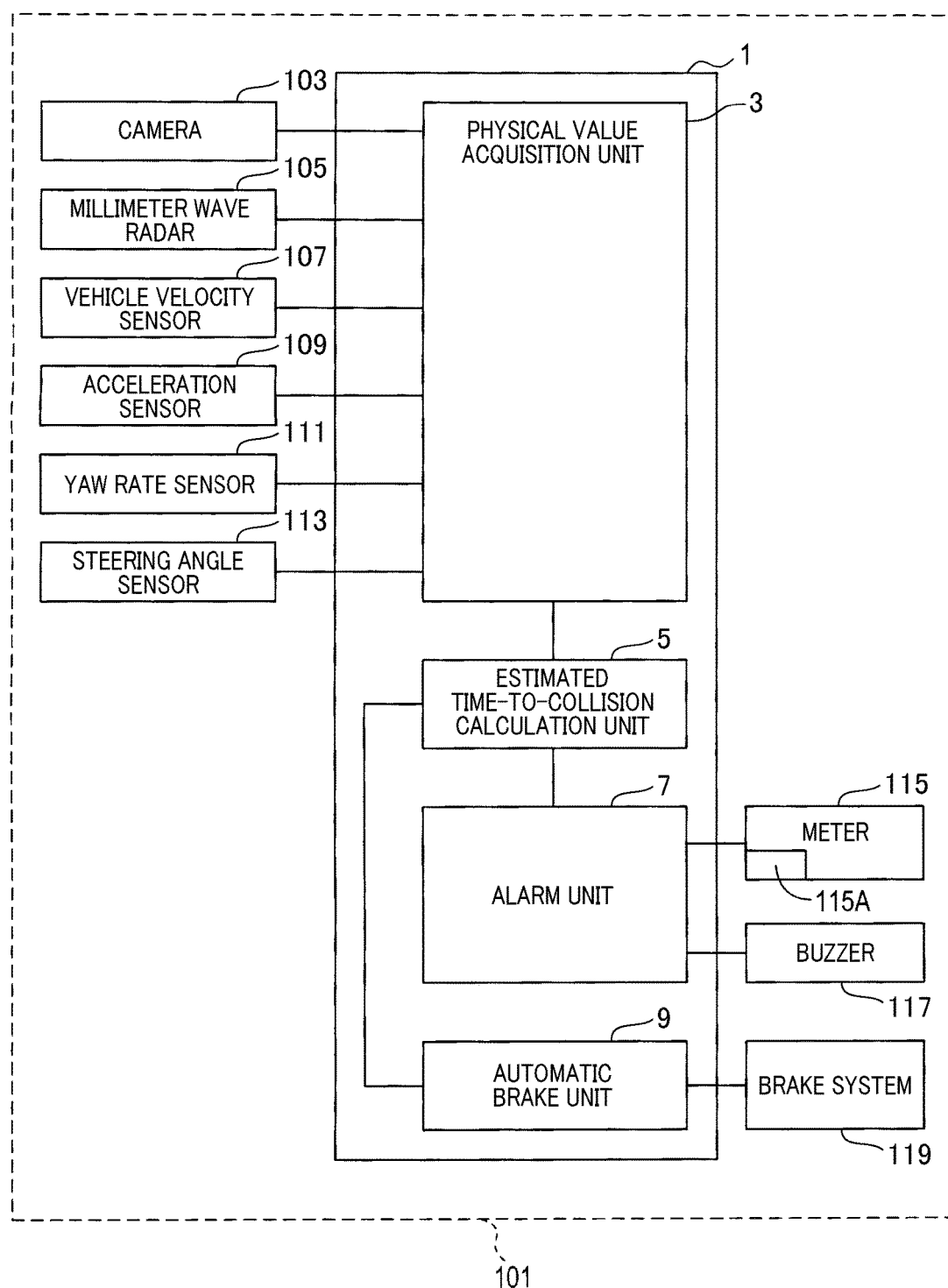
FIG. 1 is a block diagram illustrating a configuration of an estimated TTC calculation apparatus 1.

With reference to FIG. 1, a configuration of an estimated TTC calculation apparatus 1 will now be described. The estimated TTC calculation apparatus 1 is mounted to a vehicle. In the following description, an own vehicle 101 refers to a vehicle to which the estimated TTC calculation apparatus 1 is mounted.

The estimated TTC calculation apparatus 1 is a known computer installing a program to perform a process which will be described later. Functional components of the estimated TTC calculation apparatus 1 include a physical value acquisition unit 3, an estimated TTC calculation unit 5, an alarm unit 7, and an automatic brake unit 9. Processing performed by these units will be described later.

Besides the estimated TTC calculation apparatus 1, the own vehicle 101 includes a camera 103, a millimeter wave radar 105, a vehicle velocity sensor 107, an acceleration sensor 109, a yaw rate sensor 111, a steering angle sensor 113, a meter 115, a buzzer 117, and a brake system 119.

The camera 103 captures an image of the scene ahead of the own vehicle 101, and outputs data on the captured image to the physical value acquisition unit 3. The millimeter wave radar 105 detects an object (including another vehicle) ahead of the own vehicle 101, and calculates a distance X between the own vehicle 101 and the object and an azimuth of the object relative to the own vehicle 101. The millimeter wave radar 105 outputs the distance X and the azimuth to the physical value acquisition unit 3.

The vehicle velocity sensor 107 detects a velocity Y of the own vehicle 101, and outputs the velocity Y to the physical value acquisition unit 3. The acceleration sensor 109 detects an acceleration α of the own vehicle 101, and outputs the acceleration α to the physical value acquisition unit 3.

The yaw rate sensor 111 detects a yaw rate of the own vehicle 101, and outputs the yaw rate to the physical value acquisition unit 3. The steering angle sensor 113 detects a steering angle of the own vehicle 101, and outputs the steering angle to the physical value acquisition unit 3.

The meter 115 is disposed inside a compartment of the own vehicle 101, and indicates a velocity Y, for example. The meter 115 includes an alarm lamp 115A, which emits light in response to a signal (alarm signal) from the alarm unit 7.

The buzzer 117 generates an alarm in response to an alarm signal transmitted from the alarm unit 7. The brake system 119 performs braking operation of the own vehicle 101. Specifically, the brake system 119 allows the own vehicle 101 to brake when the brakes are applied by a driver, and to automatically brake in response to a signal (automatic brake signal) transmitted from the automatic brake unit 9.

The physical value acquisition unit 3 is an example of the distance acquisition unit, the relative velocity acquisition unit, the own vehicle velocity acquisition unit, the own vehicle acceleration acquisition unit, and the relative acceleration acquisition unit.

2. Process Performed by Estimated TTC Calculation Apparatus 1

Figure 2:
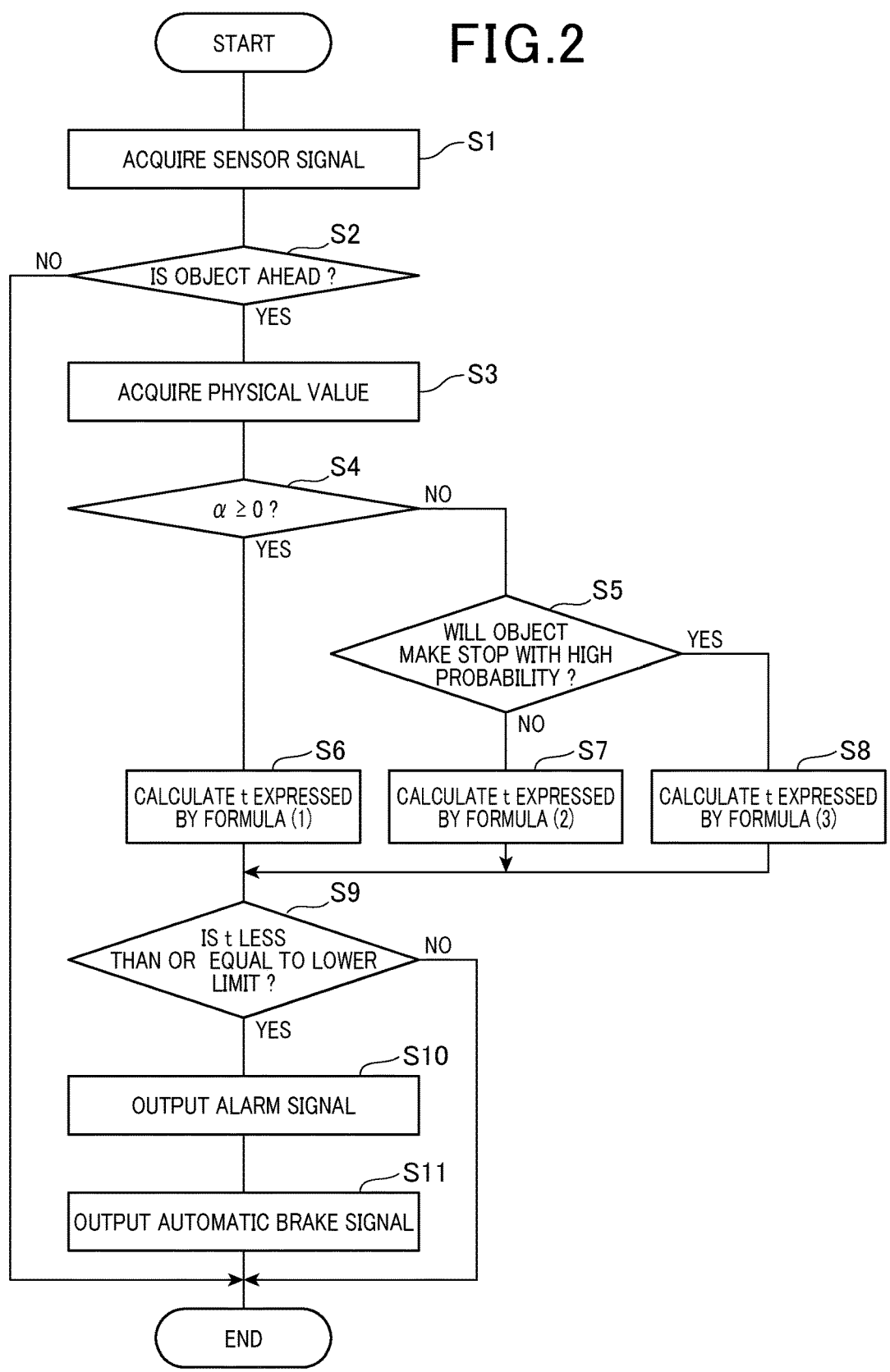
FIG. 2 is a flowchart of a process performed by the estimated TTC calculation apparatus 1.
Figure 3:
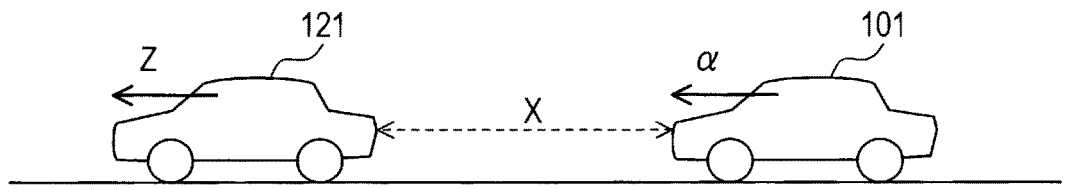
FIG. 3 illustrates a distance X between an own vehicle 101 and another vehicle 121.

With reference to FIGS. 2 and 3, a description will now be given of a process cyclically performed by the estimated TTC calculation apparatus 1. In S1 of FIG. 2, the physical value acquisition unit 3 acquires an image from the camera 103, and acquires signals detected by the millimeter wave radar 105, the vehicle velocity sensor 107, and the acceleration sensor 109.

In S2, it is determined whether an object (e.g., another vehicle) is ahead of the own vehicle, based on the detection results derived from the millimeter wave radar 105, which have been acquired in S1. If an object is determined to be ahead of the own vehicle, the process proceeds to the S3, and if not, the process terminates.

In S3, using the detected signal acquired in S1, the physical value acquisition unit 3 calculates the following physical values.

The distance X between the own vehicle 101 and the object: Calculated by the millimeter wave radar 105.

For example, when the object is another vehicle (preceding vehicle) 121, the distance X is as shown in FIG. 3.

The relative velocity V of the object with respect to the own vehicle 101: Calculated by differentiating a distance X with respect to time. The relative acceleration β of the object with respect to the own vehicle 101: Calculated by differentiating a relative velocity V with respect to time. The acceleration α of the own vehicle 101: Detected by the acceleration sensor 109. The acceleration α is an acceleration of the own vehicle 101 in the rest frame (terrestrial reference system). The acceleration α may be calculated by differentiating a velocity Y, which will be described later, with respect to time.

The velocity Y of the own vehicle 101: Detected by the vehicle velocity sensor 107. The velocity Y is a velocity of the own vehicle 101 in the rest frame (terrestrial reference system).

In S4, the estimated TTC calculation unit 5 determines whether an acceleration α calculated in S3 is greater than or equal to zero (whether the own vehicle 101 is accelerating). If the acceleration α is greater than or equal to zero (if the own vehicle is accelerating or moving at a constant velocity), the process proceeds to the S6, and if not (if the own vehicle is decelerating), the process proceeds to the S5.

In S5, the estimated TTC calculation unit 5 determines whether an object is in a state where the object will make a stop in the near future with high probability (this situation will be hereinafter referred to as "stopping state"). Specifically, when the following formula (4) is satisfied for a velocity Y of the own vehicle 101, the estimated TTC calculation unit 5 determines that the object is in the stopping state. When the following formula (4) is not satisfied for the velocity Y of the own vehicle 10, the process proceeds to the S7.

[Formula 4]

$$Y<K,\qquad\text{Formula (4)}$$

where K is a constant.

When the formula (4) holds for the velocity Y, the estimated TTC calculation unit 5 determines that the object is in the stopping state, and the process proceeds to the S8. K in the formula (4) is set to an appropriate value (e.g., 5 km/h or 10 km/h).

Generally, the formula (4) holds (i.e., the velocity Y of the own vehicle 101 is less than a constant K) when a preceding object reduces its speed and thus the probability increases that the object will make a stop. The satisfaction of the formula, therefore, corresponds to the stopping state.

In S6, the estimated TTC calculation unit 5 calculates an estimated TTC t expressed by the following formula (1). The formula (1) is an example method of calculating an estimated TTC t, based on the distance X and the relative velocity V.

[Formula 1]

$$t = \frac{-X}{V} \qquad\text{Formula (1)}$$

In S7, the estimated TTC calculation unit 5 calculates an estimated TTC t expressed by the following formula (2). The formula (2) is an example method of calculating an estimated TTC t, based on a distance X, a relative velocity V, and a relative acceleration β. When the relative acceleration β is zero, the formula (1) is used instead to calculate an estimated TTC t.

[Formula 2]

$$t = \frac{-V - \sqrt{V^2 - 2\beta X}}{\beta} \qquad\text{Formula (2)}$$

In S8, the estimated TTC calculation unit 5 calculates an estimated TTC t expressed by the following formula (3). The formula (3) is an example method of calculating an estimated TTC t, based on a distance X, a relative velocity V, and an acceleration α.

[Formula 3]

$$t = \frac{-V - \sqrt{V^2 + 2\alpha X}}{-\alpha}$$

Formula (3)

In S9, the estimated TTC calculation unit 5 determines whether any one of the estimated TTCs t calculated in S6 to S8 is less than or equal to a lower limit. If YES, the process proceeds to the S10, and if NO, the process terminates.

In S10, the alarm unit 7 outputs an alarm signal. The meter 15 causes the alarm lamp 115A to emit light in response to the alarm signal. The buzzer 17 generates an alarm in response to the alarm signal.

In S11, the automatic brake unit 9 outputs an automatic brake signal. The brake system 119 causes the own vehicle 101 to automatically brake in response to the automatic brake signal.

3. Effects of the Estimated TTC Apparatus 1

(1A) The estimated TTC apparatus 1 calculates an estimated TTC t expressed by the formula (1) when the own vehicle 101 is accelerating. When the estimated TTC t is less than or equal to the lower limit, the estimated TTC apparatus 1 outputs an alarm signal or an automatic brake signal.

Generally, when the own vehicle 101 is accelerating, an estimated TTC t expressed by the formula (1) is greater than an estimated TTC t expressed by the formula (2) or (3), and thus is less likely to be less than or equal to the lower limit.

The estimated TTC apparatus 1 reduces the risk of an alarm signal or an automatic brake signal being outputted early, using an estimated TTC t expressed by the formula (1), when the own vehicle 101 is accelerating.

The own vehicle 101 is accelerated as desired by the driver. Thus, when the own vehicle 101 is accelerating, the estimated TTC apparatus 1 does not need to output an alarm signal or an automatic brake signal early, which would otherwise cause the driver frustration.

As described above, when the own vehicle 101 is accelerating, the estimated TTC apparatus 1 reduces the risk of an alarm signal or an automatic brake signal being outputted early, using an estimated TTC t expressed by the formula (1). This reduces frustration felt by the driver.

(1B) The estimated TTC apparatus 1 calculates the estimated TTC t expressed by the formula (3) when an object ahead of the own vehicle 101 is in the stopping state. When the estimated TTC t is less than or equal to the lower limit, the estimated TTC apparatus 1 outputs an alarm signal or an automatic brake signal.

Generally, when an object ahead of the own vehicle 101 is in the stopping state, a relative acceleration 1 is highly likely to vary greatly in a short time, and accordingly an estimated TTC t expressed by the formula (2), which includes a relative acceleration β, is highly likely to vary greatly in a short time. Therefore, when an object ahead of the own vehicle 101 is in the stopping state, a calculated estimated TTC t expressed by the formula (2) may be inappropriate to an actual situation.

As described above, the estimated TTC apparatus 1 calculates an estimated TTC t expressed by the formula (3), which does not include a relative acceleration β, when an object ahead of the own vehicle 101 is in the stopping state. This configuration reduces the risk of an estimated TTC t inappropriate to an actual situation being outputted.

(1C) The estimated TTC apparatus 1 calculates an estimated TTC t expressed by the formula (2) or the formula (3), with each of the formulae (2) and (3) considering an acceleration α (α or β) of the own vehicle 101, when the own vehicle 101 is not accelerating. This configuration enables the estimated TTC apparatus 1 to calculate an estimated TTC with higher accuracy.

<Second Embodiment>

1. Configuration of Estimated TTC Apparatus 1

According to the present embodiment, a configuration of an estimated TTC apparatus 1 is identical to that of the estimated TTC apparatus 1 of the first embodiment.

2. Process Performed by Estimated TTC Apparatus 1

A process performed in the present embodiment is similar to that of the first embodiment, and thus processing common to the first embodiment and the present embodiment will not be described. The following description focuses on differences in the embodiments.

In S3, a velocity Z of an object ahead of the own vehicle 101 is further calculated. The velocity Z is a velocity of the object in the rest frame (terrestrial reference system). The velocity Z can be calculated from a velocity Y of the own vehicle 101 and a relative velocity V.

In S5, it is determined whether the object is in the stopping state, based on a velocity Z. Specifically, the object is determined not to be in the stopping state when the following formula (5) does not hold for a velocity Z calculated in S3, and the process proceeds to the S7.

[Formula 5]

$$Z < K,$$

Formula (5)

where K is a constant.

When the formula (5) holds for the velocity Z, the object is determined to be in the stopping state, and the process proceeds to the S8. K in the formula (5) is set to an appropriate value (e.g., 5 km/h or km/h).

3. Effect of Estimated TTC Apparatus 1

Besides the effects (1A to 1C) of the first embodiment, the following effect is produced according to the present embodiment.

(2A) It is determined whether an object is in the stopping state, based on a velocity Z of the object. This configuration enables the estimated TTC apparatus 1 to make the determination with higher accuracy.

<Possible Embodiments>

The exemplary embodiments of the present disclosure have been described. However, the present disclosure is not limited to the embodiments, and may be implemented in various forms.

(1) In the embodiments, the estimated TTC apparatus 1 may acquire physical values of an object (e.g., a velocity Z of the object and an acceleration of the object) via communications between the own vehicle 101 and the object. The estimated TTC apparatus 1 may acquire other physical values of the object (e.g., a distance X, a relative velocity V, and a relative acceleration β).

(2) In the embodiments, whether an object is in the stopping state may be determined in the following way. For example, an object may be determined to be in the stopping state if a velocity Z of the object is not greater than a predetermined value and an absolute value of an acceleration (negative value) of the object is not less than a predetermined value. Otherwise, the object may be determined not to be in the stopping state.

An alternative approach involves estimating a period of time taken for the velocity Z of the object to become 0, based on the velocity Z and the acceleration (negative value) of the object. If the period of time is less than or equal to a predetermined value, the object is determined to be in the object stop situation, and if not, the object is determined not to be in the stopping state.

(3) In the embodiments, a distance X may be calculated using data from an image captured by the camera 103. The camera 103 may be a single-lens reflex camera or a stereo camera.

(4) In the embodiments, a relative acceleration $\beta$ may be calculated in an alternative way. For example, an acceleration $\alpha$ of the own vehicle and the acceleration of an object may be acquired for use in calculating the relative acceleration $\beta$.

(5) In the embodiments, an output of an alarm (in S10) and an output of an automatic brake signal (in S11) do not necessarily have to be performed. In the embodiments, an estimated TTC t, which is used in an output of an alarm (in S10) and an output of an automatic brake signal (in S11), may be used for other purposes.

(6) In the embodiments, examples of an object include other vehicles (preceding vehicle, oncoming vehicle, and stationary vehicle), pedestrians, two wheelers, bicycles, guardrails, fences, sidewalls, traffic signs, obstacles on the road.

(7) In the embodiments, the processing in S4 may be modified. For example, an acceleration $\alpha$ may be compared with a positive constant, which is greater than 0. If the acceleration $\alpha$ is greater than or equal to the positive constant, the process may proceed to the S6, and if not, the process may proceed to the S5.

(8) In the embodiments, an object present in a direction other than the forward direction of the own vehicle 101 (e.g., rearward, rightward, and leftward) may be detected, and an estimated TTC for the object may be calculated.

(9) In the embodiments, if the outcome of the determination in S4 is negative, the process may always proceed to the S7. That is, when the own vehicle is not accelerating, an estimated TTC t may always be calculated using the formula (2).

(10) In the embodiments, after the processing in S3 is performed, the process may always proceed to S5.

(11) In the embodiments, an estimated TTC t is calculated using the formula (1) in S6. However, in S6, an estimated TTC t may be calculated using any method by which an estimated TTC t is calculated, based on a distance X and a relative velocity V.

(12) In the embodiments, an estimated TTC t is calculated using the formula (2) in S7. However, in S7, an estimated TTC t may be calculated using any method by which an estimated TTC t is calculated, based on a distance X, a relative velocity V, and a relative acceleration $\beta$.

(13) In the embodiments, an estimated TTC t is calculated using the formula (3) in S8. However, in S8, an estimated TTC t may be calculated using any method by which an estimated TTC t is calculated, based on a distance X, a relative velocity V, and an acceleration $\alpha$.

(14) In the embodiments, functions of a single component may be distributed between a plurality of components, or functions of a plurality of components may be implemented by a single component. In the embodiments, at least part of the configurations may be replaced by a known configuration having a similar function. In the embodiments, part of the configurations may be eliminated. In any of the embodiments, at least part of the configurations may be added to or replaced by a configuration of another one of the embodiments. Any forms encompassed by the technical idea that is only defined by the wording of the claims are embodiments of the present disclosure.

(15) Besides the estimated TTC apparatus 1, the present disclosure may be implemented in various forms, including a system including the estimated TTC apparatus 1 as a component, a program enabling a computer to function as the estimated TTC apparatus 1, a medium on which the program is stored, and an estimated TTC calculation method.

REFERENCE SINGS LIST

1. Estimated time-to-collision (TTC) calculation apparatus
3. Physical value acquisition unit
5. Estimated TTC calculation unit
7. Alarm unit
9. Automatic brake unit
101. Own vehicle
103. Camera
105. Millimeter wave radar
107. Vehicle velocity sensor
109. Acceleration sensor
111. Yaw rate sensor
113. Steering angle sensor
115. Meter
115A. Alarm lamp
117. Buzzer
119. Brake system
121. Another vehicle

The invention claimed is:

1. An estimated time-to-collision (TTC) calculation apparatus comprising:
a distance acquisition unit, performed by a processor, that acquires a distance X between an own vehicle and an object;
a relative velocity acquisition unit, performed by the processor, that acquires a relative velocity V of the object with respect to the own vehicle;
a relative acceleration acquisition unit, performed by the processor, that acquires a relative acceleration $\beta$ of the object with respect to the own vehicle; and
an estimated TTC calculation unit, performed by the processor, that calculates an estimated TTC t, the estimated TTC t being an estimated period of time until the own vehicle collides with the object,
wherein
the estimated TTC calculation unit calculates the estimated TTC t, based on the distance X and the relative velocity V, when the own vehicle is accelerating, and when the own vehicle is decelerating, calculates the estimated TTC t, based on the distance X, the relative velocity V, and the relative acceleration $\beta$.

2. The estimated TTC calculation apparatus according to claim 1, wherein the relative acceleration acquisition unit calculates the relative acceleration $\beta$ by differentiating the relative velocity V with respect to time.

3. The estimated TTC calculation apparatus according to claim 1, wherein the apparatus includes an alarm unit that outputs an alarm signal on condition that the estimated TTC t is less than or equal to a predetermined lower limit.

4. The estimated TTC calculation apparatus according to claim 1, wherein the apparatus includes an automatic brake unit that outputs an automatic brake signal causing the own vehicle to brake on condition that the estimated TTC t is less than or equal to a predetermined lower limit.

5. An estimated time-to-collision (TTC) calculation apparatus comprising:
  a distance acquisition unit, performed by a processor, that acquires a distance X between an own vehicle and an object;
  a relative velocity acquisition unit, performed by the processor, that acquires a relative velocity V of the object with respect to the own vehicle;
  an own vehicle acceleration acquisition unit, performed by the processor, that acquires an acceleration α of the own vehicle;
  a relative acceleration acquisition unit, performed by the processor, that acquires a relative acceleration β of the object with respect to the own vehicle;
  an own vehicle velocity acquisition unit, performed by the processor, that acquires a velocity Y of the own vehicle; and
  an estimated TTC calculation unit, performed by the processor, that calculates an estimated TTC t, the estimated TTC t being an estimated period of time until the own vehicle collides with the object,
  wherein
  the estimated TTC calculation unit calculates the estimated TTC t, based on the relative acceleration β, the distance X, and the relative velocity V, when the velocity Y is greater than or equal to a predetermined value, and when the velocity Y is less than the predetermined value, calculates the estimated TTC t, based on the acceleration α, the distance X, and the relative velocity V.

6. The estimated TTC calculation apparatus according to claim 5, wherein the acceleration a is calculated by differentiating the velocity Y with respect to time.

7. The estimated TTC calculation apparatus according to claim 5, wherein the relative acceleration acquisition unit calculates the relative acceleration β by differentiating the relative velocity V with respect to time.

8. The estimated TTC calculation apparatus according to claim 5, wherein the apparatus includes an alarm unit that outputs an alarm signal on condition that the estimated TTC t is less than or equal to a predetermined lower limit.

9. An estimated time-to-collision (TTC) calculation method comprising:
  acquiring a distance X between an own vehicle and an object;
  acquiring a relative velocity V of the object with respect to the own vehicle;
  acquiring a relative acceleration β of the object with respect to the own vehicle;
  calculating an estimated TTC t, based on the distance X and the relative velocity V, when the own vehicle is accelerating; and
  calculating the estimated TTC t, based on the distance X, the relative velocity V, and the relative acceleration β when the own vehicle is decelerating.

10. An estimated time-to-collision (TTC) calculation method comprising:
  acquiring a distance X between an own vehicle and an object;
  acquiring a relative velocity V of the object with respect to the own vehicle;
  acquiring an acceleration α of the own vehicle;
  acquiring a relative acceleration β of the object with respect to the own vehicle;
  acquiring a velocity Y of the own vehicle;
  calculating an estimated TTC t, based on the relative acceleration β, the distance X, and the relative velocity V, when the velocity Y is greater than or equal to a predetermined value; and
  calculating the estimated TTC t, based on the acceleration a, the distance X, and the relative velocity V when the velocity Y is less than the predetermined value.

* * * * *